Dec. 24, 1957 W. D. McCULLY 2,817,230
LEAK TESTING DEVICE
Filed Oct. 18, 1954 2 Sheets-Sheet 1
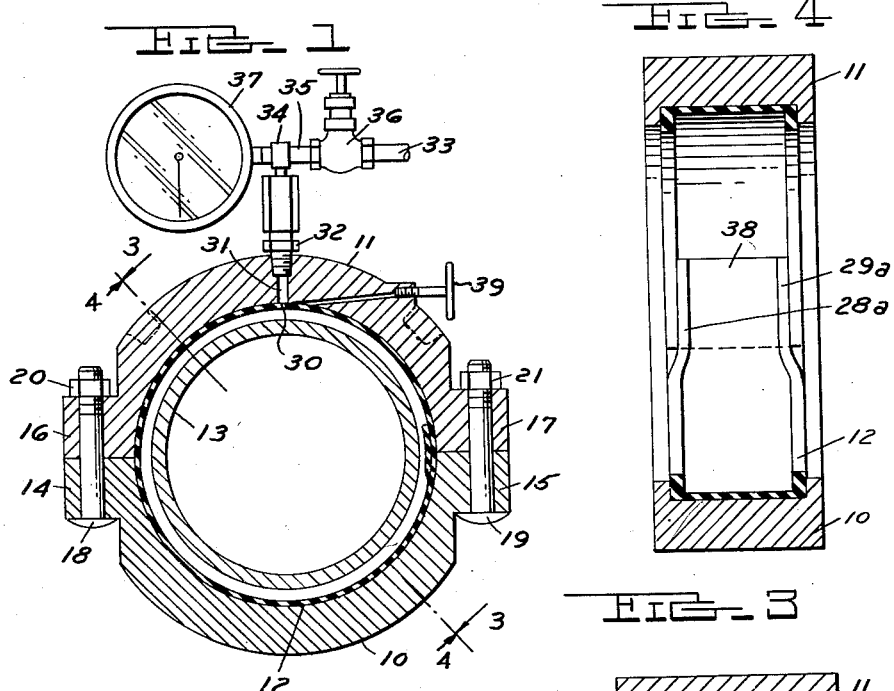
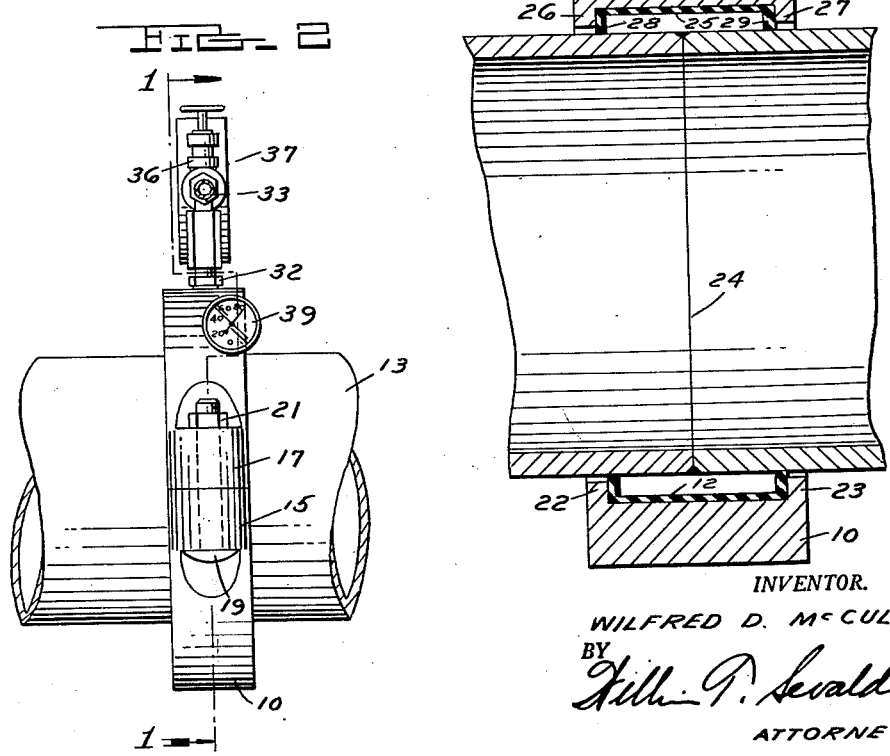
INVENTOR.
WILFRED D. McCULLY
BY
ATTORNEY

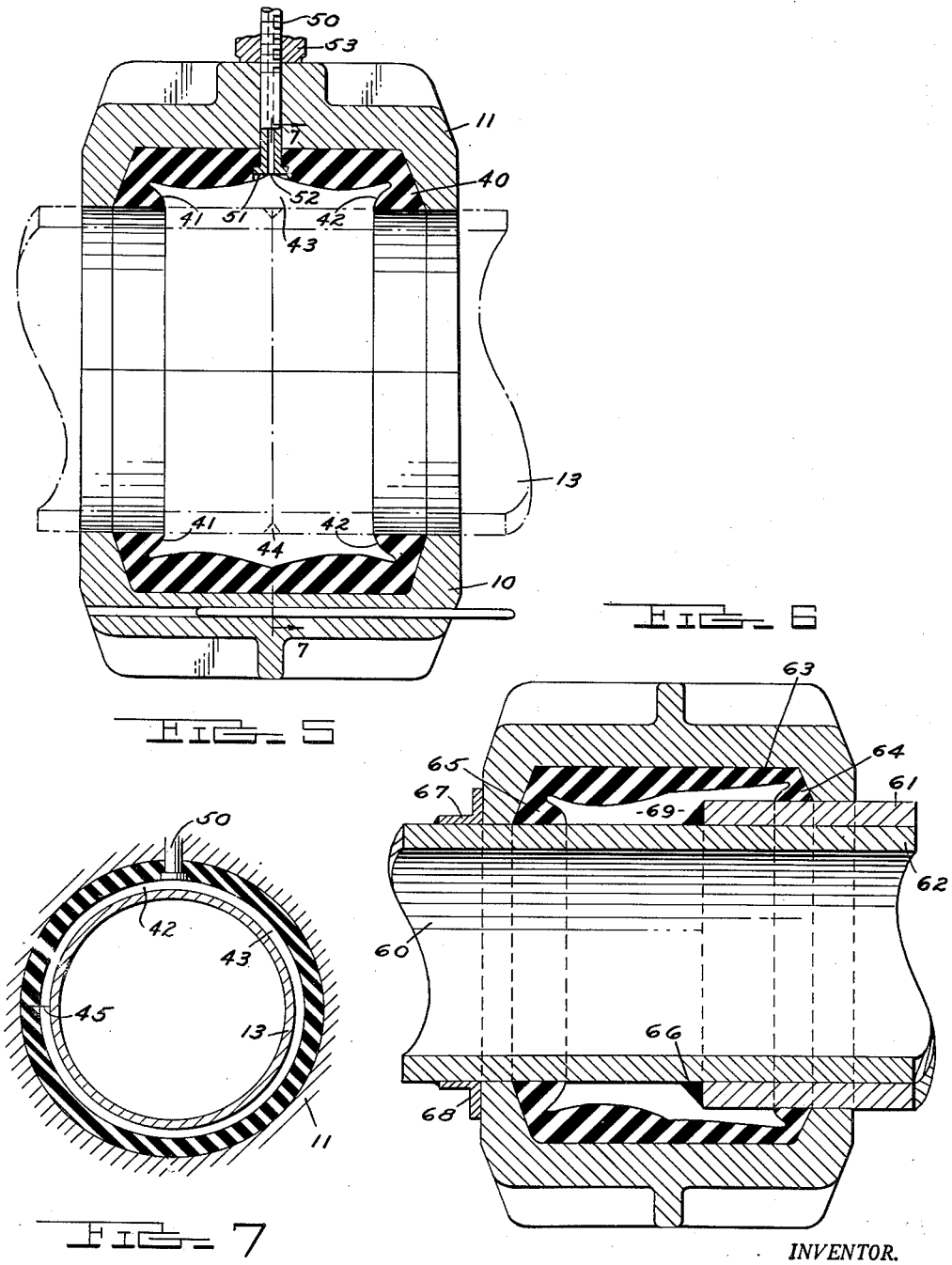

ved Dec. 24, 1957

United States Patent Office

2,817,230
Patented Dec. 24, 1957

2,817,230

LEAK TESTING DEVICE

Wilfred D. McCully, Belleville, Mich.

Application October 18, 1954, Serial No. 462,913

1 Claim. (Cl. 73—46)

This invention relates to a welded joint leak testing device and particularly pertains to a leak testing device for testing the welded joints of a pipe line externally of the pipe line intermediate the ends thereof.

Pipe line welded joint testing apparatus for determining whether or not the welded joint will leak have been employed heretofore for various pipe lines whereby the welded joints are tested under pressure but the previous methods and apparatus have been found troublesome and a great delaying factor in the pipe construction line. Some pipe lines heretofore were tested by leaving excavations approximately 2 feet by 6 feet at each welded joint as back filling proceeded without making any attempt to pressure test the welds for leakage until a complete section between manholes or stations were welded up, which would amount to a distance of 1500 to 2700 feet. The line was then blocked off at either end and a special air compressor or compressed nitrogen was used to put a pressure inside the pipe line. Rubber water pans were then placed around each of the 35 or 65 welded joints and each joint was checked for air bubbles. This was a fairly good method of testing the joints but with leaving the holes open along the ditch, the construction was costly as it was usually necessary to keep the excavations covered. Also the ground and surface water was continually washing the fill material from the adjoining trench into the excavations and a good deal of bracing, pumping, re-excavating was required, resulting in an extremely costly procedure to the contractor.

Subsequent to that time, incremental testing apparatus and procedure was employed whereby at the end of each day, the section laid that day was separately tested. In this connection, the day's welded lay of pipes was blanked off at either end and the pressure built up from the last completed manhole to the blanked end. The welds on a newly laid portion are then checked with water pans and the seamastic joint covering applied and the excavation back filled. While this system and method of testing avoided to a considerable extent the objections of adjoining property owners and governmental officials, it was found out not to be the complete answer in that such testing consumed a great amount of nitrogen and gas per weld as well as the pipe fitters time every day. It was also found that in either type of the previous manners of testing the welds, that the internal compressing of the gas or air left moisture residues in the pipe which required flushing, which flushing caused precipitating of moisture and an unsatisfactory dew-point which had to be later dried out with a drying gas.

In some instances, pipe laying companies weld all their pipe and test it above the grade prior to placing the pipe in the trench or ditch, however, the governmental officials object to testing pipe above the surface of the ground under high pressure due to the number of accidents that have occurred as a result of blow outs.

Due to the objectionable characteristics of the above mentioned manners of testing, double rubber diaphragms were developed and inserted in the pipe line to the correct location straddling the welds last made and the diaphragms themselves were first inflated to a very high pressure such as 700 pounds per square inch and the short space between them, usually 2 to 3 feet, was then brought up to 500 pounds per square inch and an ordinary water bath test applied to the exterior of the welds so as to determine leakage by air bubbles. The objection to this last manner of testing was the disadvantage of necessitating two armored hoses and a steel pulling cable required for operating the device and the several hundred feet of equipment all of which was cumbersome and difficult to handle in the trench and also the positioning and welding of the adjoining sections of pipe was hampered due to the fact that welding could not be continued while the testing was going on.

With the foregoing in view, the primary objects of the invention are to provide an exterior pipe line welded joint testing device which is simple in design and construction, inexpensive to manufacture, easy to use, inexpensive to use, and which will not interfere with pipe welding, pipe laying, and back filling, and will not require elaborate equipment and many man hours to operate.

An object of the invention is to provide a pipe line welded joint testing device which can be manufactured more inexpensively as the component parts are easily made and the assembly of parts readily accomplished.

An object of the invention is to provide a pipe line welded joint testing device which can be operated by ease by an ordinary skilled workman who has been instructed in the use of the device.

An object of the invention is to provide a pipe line welded joint testing device which can be made to fit all size pipes and pipe lines without changes in the assembly or arrangement of the parts or in operating the device.

An object of the invention is to provide a pipe line welded joint testing device which is easily mountable on the pipe line welded joint and which is easily demountable from the pipe line welded joint.

An object of the invention is to provide a self-sealing boot which can be modified in construction so as to be equally usable on butt-welded and lap-welded joints.

An object of the invention is to provide a self-sealing valve stem relative to the boot so as to prevent the leakage of gas therearound.

An object of the invention is to provide a split boot of a size somewhat larger than the pipe to which the boot is to be applied so that when the housings are applied therearound the butted ends of the split boot are urged into sealing relationship with one another.

These and other objects of the invention will become apparent by reference to the following description of the pipe line welded joint testing device embodying the invention taken in connection with the accompanying drawings in which:

Fig. 1 is a cross-sectional view taken on the line 1—1 thereof of Fig. 2 showing the inventive device mounted in testing condition on a weld pipe line welded joint.

Fig. 2 is a side elevational view of the device as seen in Fig. 1.

Fig. 3 is a cross-sectional view taken on the line 3—3 of Fig. 1.

Fig. 4 is a cross-sectional view of a portion of the inventive device showing a modified overlap of one form of the sealing boot.

Fig. 5 is a cross-sectional view similar to Fig. 3 showing a modified boot construction, valve stem integration, and thermometer installation.

Fig. 6 is a view similar to Fig. 5 showing a modified boot construction particularly suitable for testing lap-joint pipe connection; and Fig. 7 is a cross-sectional view of Fig. 5 taken on the line 7—7 thereof.

Referring now to the drawings wherein like numerals refer to like and corresponding parts throughout the several views, the pipe line welded joint testing device disclosed therein to illustrate the invention comprises a first substantially semi-circular housing 10 having an internal peripheral groove, a second substantially semi-circular housing 11 having an internal peripheral groove which internal peripheral grooves receive and position the sealing boot 12 immediately adjacent the pipe line 13. The housings are equipped with apertured connecting ears 14, 15, 16, and 17 which receive the bolts 18 and 19 upon which are threaded the nuts 20 and 21 so that the housings 10 and 11 can be brought together forceably in abutting relationship and secured against high internal pressures exerted against the boot 12.

More particularly, the inventive pipe line welded joint testing device, comprises a first substantially semi-circular housing 10 adapted to surround substantially half the circumference of the pipe line 13 welded joint area to be tested, which housing 10 is adapted to be radially applied to the pipe line 13 intermediate its length in concentric relationship to the pipe line. The housing 10 is equipped with first paired internal interspaced ribs 22 and 23 extending radially inwardly towards the pipe line 13 on either side of the welded joint 24, so that the ribs 22 and 23 and the housing body intermediate thereof define a substantially semi-circular internal chamber within the first housing 10 relative to each other and the internal periphery of the housing 10 in semi-surrounding relationship to the pipe line welded joint area. The second substantially semi-circular housing 11 is adapted to surround the remaining circumference of the pipe line 13 in the welded joint 24 area to be tested and is also adapted to be radially applied to the pipe line intermediate its length in concentric relationship to the pipe line, and it is to be noted that the second housing 11 is also equipped with second paired internal interspaced ribs 26 and 27 which extend radially inwardly towards the pipe line 13 at either side of the welded joint 24 defining a like substantially semi-circular internal chamber within said second housing 11 in surrounding relationship to the remainder of the welded joint.

It is to be noted that the housings are adapted to edgewise abut each other and that they are easily bolted together so as to completely surround the pipe line 13 in the area of the welded joint 24 with the internal chambers of the housings 10 and 11 intercommunicating with each other so as to form an annular chamber within the connected housings adjacent the pipe line 13 in the area of the welded joint 24.

Disposed within the annular chamber as formed by the housings 10 and 11 is the sealing boot 12 which is vulcanized in an annular pattern and is substantially U-shaped in cross-section and disposed within the annular chamber formed by the housings 10 and 11 and so as to contact the pipe line 13 body external periphery at the extending ends 28 and 29 of the boot 12 and so that the body portion 25 of the boot 12 lies in spaced relationship relative to the external periphery of the pipe line 13 to define an internal circular chamber within the boot relative to the pipe line 13 in the area of the welded joint 24, and, it is to be noted that the boot 12 is equipped with a transverse aperture 30 and that one of the housings, such as the housing 11, is equipped with a transverse aperture 31 which is in communication with the boot aperture 30 communicating between the internal chamber as formed by the boot and the exterior of the housings.

A threaded hollow stem 32 is screwed in the aperture 31 and a tube 33 is connected to the stem 32 such as by the fitting 34 nipple 35, and shut off valve 36, and it is to be noted that the gage 37 is connected to the fitting 34 so as to be in communicative action via the tube 32 with the hollow interior of the stem 32.

A pump or a high pressure gas tank, not shown, is connected to the tube 33 for supplying pressure to the chamber inside the boot adjacent the pipe line 13 as to initially force the boot 12 extending ends 28 and 29 into pressure sealing relationship against the external periphery of the pipe line 13 at either side and in surrounding relationship to the weld 24. After the boot is urged into sealing relationship, additional pressure is fed into the chamber inside the boot over the weld 24 area until the gage 37 registers the desired pressure at which it is desired to test the pipe line weld for leakage. Upon the desired pressure being accomplished in the chamber, the valve 36 is turned off and the gage 37 is then watched in regard to its registering the confined pressure in pounds per square inch so that a drop in pressure as registered on the gage will indicate a leak in the welded joint.

It has been found advantageous with the inventive device to test the welds at extremely high pressure such as 900 pounds per square inch with an extremely small volume of gas contained in the internal chamber and apparatus such as 9.4 cubic inches and it has been found that a .010th inch diameter tube leading to the tank supply connection would make the installation extremely safe.

Relative to installing the sealing boot 12 intermediate the ends of the pipe line length, it has been found good to use a circular boot and move the boot down the pipe line length to the next joint if desired. However, it has been found that to cut the boot cross-wise and upon applying the boot to the pipe joint to be tested, to put some rubber cement on the cut edges of the boot and dispose them together so that the boot will then semi-vulcanize itself together under the heat of the compression and make a seal that cannot be opened or penetrated by the high internal pressure.

Referring to Fig. 4, it can be seen that the boot can be so made as to be overlapped so that the internal overlapping area 38 does not substantially deminish the internal chamber between the boot and the pipe line, and, it has been found that the extending edges of the boot 28A and 29A will so seal themselves against the other edges of the boot which they overlap so as to form a satisfactory seal.

In mounting the device on a pipe line joint, it has been found best to put the boot in position around the joint and put the lower housing 10 in position on the boot and apply the top housing 11 on the lower housing 10 and secure the bolts and nuts 18, 19, 20, and 21 so as to firmly and securely unite the device in working condition. The tube 33 is then connected to the high pressure gas source, which is preferably a nitrogen gas tank, and the valve on the gas tank is then opened and the pressure is allowed to build up internally of the boot chamber. It has been found exceedingly desirable to employ a thermometer 39 to determine the heat of the internal chamber, which in conjunction with the registration of the gage, can be calculated as to whether or not the welded joint is actually leaking or whether the temperature is dropping thereby allowing the gas to condense and thereby falsely indicate a leak which is not present. In other words, if the thermometer 39 is dropping in temperature, a drop in the pressure registered by the gage 37 can be expected without the welded joint 24 actually leaking. Upon the thermometer 39 stabilizing at a temperature, it has been found that the gage 37 stops indicating a drop in pressure, and, when this condition exists, the welded joint is indicated as not leaking.

Referring now to the modified form of the device shown in Figs. 5, 6, and 7 and referring particularly to the device as seen in Figs. 5 and 7, it is to be noted that the boot 40 is formed with internal peripheral flanges 41 and 42 which lead into the chamber 43 so that gas pressure in the chamber 43 acts downwardly on the flanges 41 and 42 forcing them into sealing relationship with the periphery of the pipe line 13 on either side of the welded joint 44. The boot 40 is usually preferably formed slightly larger in diameter than the pipe line to which it is to be annexed so that when the housings 10 and 11 are positioned and bolted in place, the boot is pressed up against the pipe line 13 as it is compressed by the housings 10 and 11 so that initial sealing relationship is established through compression. The boot is also preferably integrated larger in diameter than the pipe line 13 so that it can be moved easily axially down the pipe in the event that it is formed in a circular pattern, however, the boot 40 can be transversally cut, such as at 45 degrees and the boot then wrapped around the weld and the rubber cement applied to the ends of the butted portions to hold it in place until the housings 10 and 11 are locked over and it has been found that due to the heat of compression, that the rubber cement usually vulcanizes the butted ends of the boot 40 together thereby making the abutting relation impervious even to high pressure gas permeation.

The tube stem 50 is formed with an enlarged head 51, the surface of which is greatly larger in area than the area of the aperture 52 of the tube stem 50 so that internal gas pressure in the gas chamber 43 tends to force the stem head 51 into sealing relationship with the boot 40 thereby preventing the leakage of gas around the stem 50 and in this connection, the nut 53 is used to initially place the head 51 of the stem 50 into a compressed relation against the boot 40 prior to the introduction of the gas. It is obvious that the gage 37 and valves 36 and the rest of the equipment is connected to the stem 50 as hereinbefore similarly described in connection with the numerals 31 and 32 respectively.

Referring now to the device as seen in Fig. 6 wherein the pipe line is connected together by a lap welded joint wherein the bell portion of 61 of one pipe is overlapped over the end portion 62 of the other pipe, it is to be noted that the boot 63 has a short leg 64 and a long leg 65 to facilitate placing the boot and the rest of the device in proper relationship over the lap weld 66. And in this connection, it has been found that it is advisable to weld stops 67 and 68 on the smaller diameter pipe 60 to prevent the high pressure internally of the boot reacting against the overlapping portions 61 and the weld area 62 and moving the device to the left as seen in the drawing due to the fact that there is more area in the left hand long leg 65 portion of the internal chamber 69 than there is in the short leg 64 side of the device.

With the inventive device, a welded joint can be tested as soon as it is cooled without hampering the assembly or welding of adjoining pipe. This eliminates to a great extent the handling of high pressure nitrogen which usually cause accidents with internal testing apparatus and, in spite of the high pressure at which the inventive external tests are made, such as 900 pounds per square inch, it has been found that a small volume of gas used and contained in the test apparatus and the small orifice leading from the supply tank makes the test comparatively safe. It has been found that with proper methods of application and some experience, that the total time for testing a weld should take around 20 minutes which includes mounting and dismounting the device and allowing a suitable time interval for cooling of air compression and holding of the pressure for the proper testing and possible leaking of the weld. It has also been found that the device is extremely accurate in that it has been determined by the net drop in pressure of 4 pounds per square inch in 5 minutes represents a leak rate of 2 cubic centimeters of gas per minute in a line operating under a pressure of 215 pounds per square inch.

The real value of the inventive device can be best appreciated in connection with the excavation contractor, the pipe line contractor, and the pipe line company in conjunction with reducing the length of time that excavations must be held open and that welding and laying of the pipe is not interfered with. Due to the fact that the bracing and shoring is completely eliminated and that welding can go on uninterruptedly, it can be seen that the device has high utility in conjunction with the work involved. The inventive device completely eliminates the purchase, storing, handling, and transporting of large quantities of nitrogen, the armored hoses, diaphragms, and other internal testing equipment necessary for such type of testing.

The inventive welded joint pipe testing device with the features explained constitutes a compact, durable, neat appearing, and efficiently operating mechanism, easily transported, and moved from joint to joint for rapidly testing the joint for leakage.

Although but a single embodiment of the invention with modifications has been shown and described in detail with various modifications of the boot, it is obvious that many changes may be made in the size, shape, detail, or arrangement of the various elements of the invention within the scope of the appended claim.

I claim:

A pipe welded joint seal testing device for immediately determining whether or not the welded joint will leak under pressure, comprising a first substantially semi-circular internally grooved housing adapted to surround substantially half the circumference of a pipe line welded joint to be tested and adapted to be radially applied to the pipe line forming an internal chamber within said first housing relative to the welded joint, a second substantially semi-circular internally grooved housing adapted to surround the remaining circumference of a pipe line welded joint to be tested and also adapted to be radially applied to a pipe line forming an internal chamber within said second housing relative to the remainder of the welded joint; said housings being adapted to endwise abut each other and to be connected together so as to completely surround a pipe line with the internal chambers thereof intercommunicating with each other so as to form an annular chamber within the connected housings adjacent the pipe line in the area of the welded joint, and an annular flexible boot substantially U-shaped in cross-section having extending ends and an intermediate portion disposed within the chambers of said connected housings so as to contact a pipe line body external periphery at the extending ends of said boot and to lie in spaced relationship relative to a pipe line in the intermediate portion of said boot so as to define an internal circular chamber within said boot relative to a pipe line in the area of the welded joint; said boot having a transverse aperture; one said housing having a transverse aperture communicating with said boot aperture for exterior communicating with said housing aperture, a stem disposed in said housing aperture, a tube connected to said stem, a pressure gage connected in said tube adjacent said stem, a source of pressure connected to said tube, a shut off valve disposed in said tube adjacent said stem, whereby gas under pressure is introduced into said boot annular chamber so as to force said boot against said ribs and housings and the pipe line body in sealing relationship on either axial side and radially over the welded joint and to subsequently build up the desired pressure in the annular chamber over the welded joint; said valve being adapted to shut off the pressure when the desired pressure is registered on said gage; said gage being adapted to register a drop in pressure so as to indicate a leak in the welded joint, and a thermometer leading to said boot area to register a drop in temperature in said boot area to indicate stable or unstable gas temperature conditions so as to preclude mistaking a drop in pressure due to a drop in temperature for a leak in the welded joint.

References Cited in the file of this patent

UNITED STATES PATENTS

| 1,788,845 | Reynolds | Jan. 13, 1931 |
| 1,931,502 | Markle et al. | Oct. 24, 1933 |
| 2,383,455 | Abadie | Aug. 28, 1945 |
| 2,571,236 | Hamilton | Oct. 16, 1951 |
| 2,633,015 | Morris | Mar. 31, 1953 |

FOREIGN PATENTS

| 1,050,021 | France | Aug. 26, 1953 |